United States Patent [19]

Santen

[11] 4,019,895
[45] Apr. 26, 1977

[54] METHOD OF REDUCING ORE USING A PLASMA BURNER

[75] Inventor: Sven Santen, Hofors, Sweden

[73] Assignee: SKF Industrial Trading and Development Company, B.V., Nieuwegein, Netherlands

[22] Filed: Feb. 10, 1975

[21] Appl. No.: 548,743

[30] Foreign Application Priority Data

Feb. 20, 1974 Sweden .............................. 7402210

[52] U.S. Cl. .................................. 75/11; 75/38; 75/40
[51] Int. Cl.$^2$ ........................................ C21C 5/52
[58] Field of Search .......................... 75/11, 40, 38

[56] References Cited

UNITED STATES PATENTS

| | | | |
|---|---|---|---|
| 2,182,009 | 12/1939 | Wiberg ................................ | 75/40 |
| 2,919,983 | 1/1960 | Halley ................................. | 75/38 |
| 3,295,955 | 1/1967 | Cordier ............................... | 75/11 |
| 3,558,791 | 1/1971 | Gachev et al. ..................... | 13/9 |

FOREIGN PATENTS OR APPLICATIONS 1,314,039  4/1973  United Kingdom .................. 75/11

*Primary Examiner*—M. J. Andrews
*Attorney, Agent, or Firm*—Daniel M. Rosen

[57] ABSTRACT

A method of producing metal from an oxidic material wherein final reduction and melting of a pre-reduced oxidic material takes place in the presence of a solid reduction agent in lump form, and wherein the reducing gas leaving the final reduction stage is used for pre-reducing the incoming oxidic material without the presence of solid reduction agent, and wherein extra energy is supplied to the final reduction and melting stage by means of a gaseous energy carrier and that the gas leaving the pre-reduction stage is used as fuel for pre-heating incoming oxidic material.

6 Claims, 1 Drawing Figure

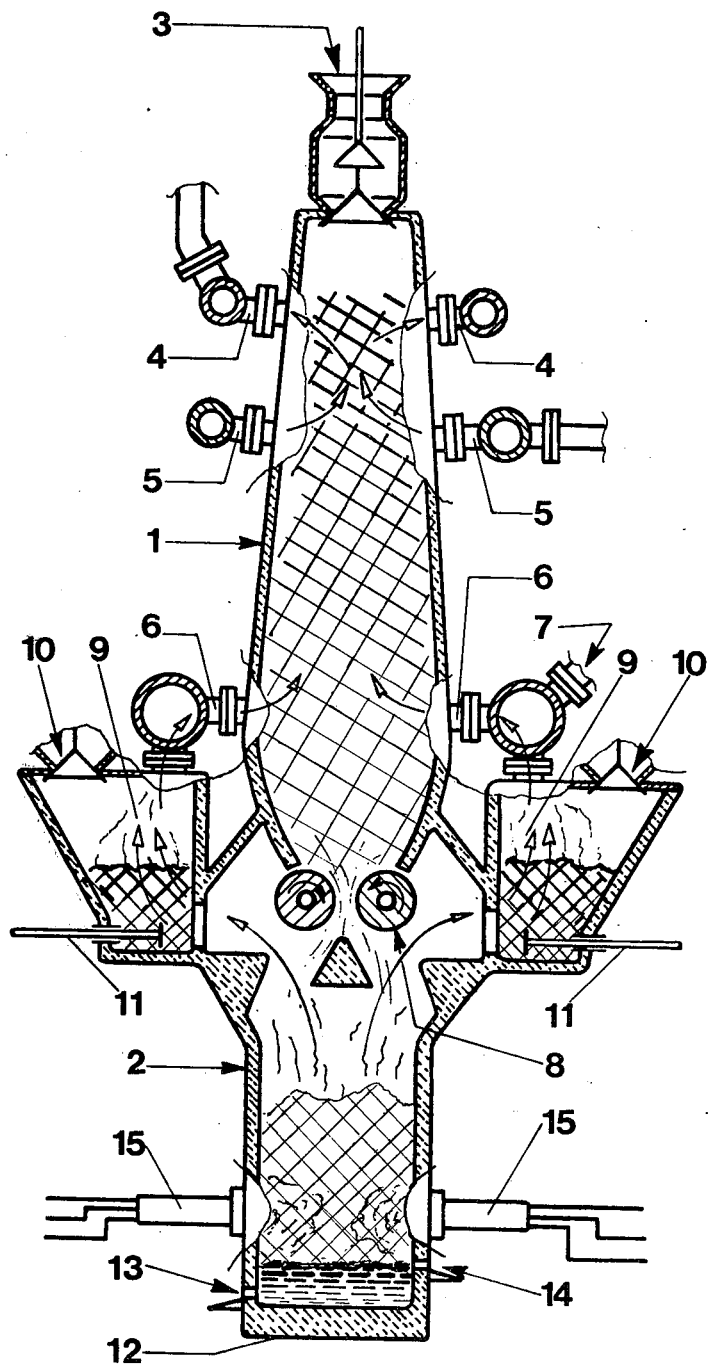

METHOD OF REDUCING ORE USING A PLASMA BURNER

THE INVENTION

The present invention relates to a method and a device for producing metal, preferably crude iron, from an oxidic material.

A basic problem in producing iron, which is the most common metal produced from oxidic raw material, is transformation and transport of energy. The central significance of this problem is to the greatest extent due to the fact that iron production incorporates steps which theoretically require much energy, but also that there is a substantial difference between the theoretically required energy and the energy required by the hitherto known production methods.

The substantial difference between the theoretical and actual energy requirement is due partly to difficulties in supplying energy with a highh efficiency to the steps in the process which have an energy shortage, and partly to the difficulty of adjusting the different reactions in the process so that a maximum gas utilization is achieved.

The most common method of producing iron from iron oxides is the blast furnace process. Other important methods are the sponge iron processes, in which group the shaft furnace methods are most common.

The above mentioned methods have, however, a number of disadvantages. In the blast furnace process the specific energy comsumption is high, the specific gas flow is high and which causes very high gas velocities through the charge, this puts high requirmments on the reactivity and mechanical strength of the energy source which dominates the process, i.e. the cokes, requires high investments in auxiliary equipments such as cowper apparatus and blower, and requires an expensive exhaust gas treating system due to the fact that the gas has a high CO-content and that the specific exhaust gas volume is great. In the sponge iron processes, the specific energy consumption is high, the specfic gas flow is comparatively high, and the specific production is low because of the limited temperature level. Furthermore, large amounts of hot gas have to be recirculated in order to achieve an acceptable gas utilization, which makes the process more expensive from the investment and maintenance point of view, and the sponge iron also has to be cooled before it is exposed to the air, which makes the process complicated and causes an energy loss.

In order to overcome at least some of the above mentioned disadvantages, different methods have been proposed, which deviate from standard sponge iron and blast furnace processes, respectively. It is known, e.g. from the Swedish patent publication No. 19089, to produce crude iron by reducing and melting in different furnaces, in which process the carbon monoxide leaving the melting furnace which is charged by cokes is used for the reduction in the other furance. Such a process gives a better energy yield than a normal blast furnace process, but nevertheless, the process entails considerable energy losses, due to for example, to the difficulty of adjusting the cokes charge in the melting zone so that it is sufficient for achieving the melting of the iron and at the same time an optimum amount of carbon monoxide at an optimum temperature for use in the reduction process is produced in the melting process.

It has also been suggested to reduce ore in a shaft furance, which is charged by only ore and possibly slag forming additives, i.e. without cokes. In the bottom of the furnace reducing gases are supplied, which gases are emitted from a partial combustion and are heated by their combustion heat and by additionally supplied heat. Further, solid carbon in powder form, especially in the form of soot from the partial combustion, is supplied to the lower portion of the furnace. The absence of cokes and the use of powder, mainly soot, as solid reduction agent by the final reduction and melting will, however, cause the disadvantage that production disturbances will occur at high temperatures by the fact that the gas permeability in the charge becomes poor because no solid reduction agent in lump form is present and supports the charge. The presence of soot accentuates the difficulties of obtaining a desired gas flow. Furthermore, the reduction gas is generated to the greater part by oxygen from oxygen gas or air, which has the double disadvantage that the amount of reduction agent increases and the specific necessary gas flow through the charge increases.

SUMMARY OF THE INVENTION

The object of the present invention is therefore to achieve an optimum energy utilization in all steps of the reduction process, which minimizes the total energy loss, and to make it possible to maintain an undisturbed production. This is achieved by utilizing a method and device according to the accompanying claims.

BRIEF DESCRIPTION OF THE DRAWINGS

The invention will be described in detail below with reference to the accompanying drawing, which shows in sectional, elevation view one embodiment of a device according to the invention.

DETAILED DESCRIPTION OF THE PREFERRED EMBODIMEMT

The device consists in principle of two shaft furnaces 1 and 2, wherein the furnace 1 comprises a heating and an initial, partial, or pre-reduction zone, and furnace 2 comprises a final reduction and melting zone. The furnaces are connected to each other in such a way that the reducing gas leaving furnace 2 can be introduced into furnace 1, and the oxidic material which is heated and initially and partially, or pre-reduced in furnace 1 can be introduced into furnace 2. Therefore furnace 1 is preferably situated above furance 2, as shown in the drawing.

The furnace 1 is at its top provided with an aperture 3 for introducing oxidic material, e.g. iron ore pellets. Exhaust gas openings 4 are provided near the aperture 3. Below the exhaust gas openings, intakes 5 are provided for introducing combustion air and possible additional fuel for burning the reducing gas which arrives from below. In the bottom portion of the furnace 1, intakes 6 for introducing reduction gas leaving the furnace 2 are provided. It may be preferable also to provide an intake 7 for introducing extra reduction gas in connection hereto. In the bottom of the furnace 1, a device 8 for feeding the partially-reduced material into the furnacee 2 is provided.

In connection to the furnace 2, containers 9 are provided, in which a solid reducing agent in the form of lumps, preferably cokes or charcoal, for use in the furnace 2 is kept. At the top, these containers are provided with apertures 10 for supplying the reducing agent and possible slag formers, and at the bottom they are provided with devices 11 with which the reduction agent is introduced into the furnace 2. The containers 9 are suitably connected with the intakes 6 and the gas outlets from the furnace 2, which means that the gases leaving the furnace 2 flow through the containers 9 with their contents of a reduction agent before being introduced into the furnace 1 through the intakes 6, whereby the reducing agent is preheated before being introduced into the furnace 2, and the reduction gas will obtain a suitable temperature, 650–1000° C for reduction of iron ore, before being introduced into the pre- or partial-reduction step. The gases may either flow freely through the reducing agent, or they may flow through special heat exchanging devices provided in the containers 9.

The furnace 2 comprises at the bottom a container 12 for molten metal. The container is provided with pouring holes 13, 14 for metal and slag, respectively, on top of the container 12, devices 15 for supplying extra lest energy to the final reduction and melting zone are provided. These devices preferably consist of plasma reactors through which gas is fed before being introduced into the furnace 2. When passing through the plasma reactor, heat energy is supplied to the gas by electric means. It may be preferable to use a reducing gas in this connection. It is also possible to generate a reducing gas in the very reactor, e.g. by supplying oxygen and hydrocarbon, which react in the reactor while producing e.g. carbon monoxide and hydrogen gas.

The following is a description of a process for producing fluid crude iron from iron ore, carried out in a device such as the one described above. The oxidic material is suitably supplied in lump form through the aperture 3. After introduction into the furnace 1 it is preheated, preferably to between 600° C and 1100° C, by burning or reduction gas arriving from later process steps. Combustion air is thereby introduced through the intakes 5. In case the reduction gas is insufficient for achieving a desired pre-heating, extra or supplemental fuel may be supplied, preferably to the combustion air. The gas leaving the furnace 1 through the exhaust gas openings 4 has given off both its chemical and physical energy contents when leaving the furnace. The exhaust gas mainly consists of $CO_2$, $H_2O$ and $N_2$ and has a temperature below 500° C.

After pre-heating, the oxidic material is pre-or partically-reduced to a suitable reduction rate with the reduction gas arriving from later process steps through the intakes 6. The gas mainly consists of carbon monoxide or a mixture of carbon monoxide and hydrogen gas. The pre-reduced material is then fed into the final reduction and melting furnace 2 by the devices 8 provided at the bottom of the furnace 1, which devices are shown in the figure as rolls, as an example. The furnace 2 is charged by the material arriving from the furnace 1 and further by a solid reduction agent in lump form, preferably cokes or charcoal, from the containers 9. Slag forming agents may be added to the reduction agents. The size of the lumps is suitably such that more than 90% of the lumps have a diameter exceeding 7 mm. Final reduction and melting in the furnace 2 preferably takes place at a temperature between 800° C and 3000° C. When reducing iron oxide with solid carbon a reducing gas, mainly CO, develops, which gas is used as above described.

A reduction agent is supplied to the furnace 2 in such a quantity that the mixture of oxidic material from the furnace 1 and solid reduction agent is given a suitable consistency mainly in view of permeability, and that the final reduction of the oxidic material is complete. In order to cover the energy requirements at final reduction and melting, extra energy must be supplied. This energy is supplied by a gaseous energy carrier, i.e., a heated gas which means a very efficient supply of energy to the material situated in the furnace 2, because it is penetrated by the flow of the energy carrier. For the supply of energy to the energy carrier, one or more so called plasma reactors are used. Such reactors are know per se, and they are charged with electrical energy. Thereby the energy supply can be accurately adjusted, so that the process always can have an optimum efficiency. In case the solid reduction agent supplied is insufficient for achieving a complete reduction, extra reduction gas can be supplied to the process. This can be done via the intake 7 in connection to the pre-reduction step and/or directly into the furnace 2. In the last mentioned case, the energy carrier can also be used as a reduction gas. By using plasma reactors it is also possible to generate a suitable reduction gas in the very reactor, as previously mentioned.

When producing liquid iron from hematite using cokes as a solid reduction agent, the theoretically most suitable pre-reduction rate is about 50% for an optimum gas utilization. Such a prereduction rate requires an extra supply of heat energy and reduction gas to the process, and this can be done in the way described above. It is also possible to carry out the process at a lower pre-reduction rate, which means that extra supply of reduction gas is unnecessary, but thereby the consumption of cokes and extra energy rises. Furthermore, it is necessary to add extra fuel into the preheating stage for achieving an optimum gas utilization.

Provided that the incoming oxidic material has the temperature 0° C, outgoing crude iron contains 3%C and has the temperature 1500° C, the gas utilization in relation to equilibrium is 90%, the efficiency rate of the electrical equipment is 80%, the carbon content in the cokes is 86% and the efficiency rate of the pre-heating stages is 70%, the process will consume about 220 kgs of cokes and 20 kgs of hydrocarbon for the reduction, 5 kgs of hydrocarbon for pre-heating, 17 $Nm^3$ oxygen gas, and 1020 kWh electrical energy for producing one ton crude iron from hematite. The total energy supply from cokes, hydrocarbon and electricity is thereby about 2,7 Gcal. As a comparison it can be mentioned that in the blast furnace process, the energy consumption is about 3,8 Gcal per ton crude iron, and in the sponge iron process plus melting, the energy consumption is about 4,2 Gcal per ton crude iron.

I claim:

1. In a method of reducing iron ore, the steps comprising: providing first and second furnaces, feeding said ore into said first furnace, flowing reduction gas from said second furnace into said first furnace, partially reducing said ore in said first furnace with said reduction gas, preheating said ore in said first furnace by burning at least some of said reduction gas therein, feeding into said second furnace a charge comprising a solid carbon reducing agent in lump form, and said partially-reduced ore from said first furnace, said charge forming a permeable mixture, supplying heat energy to a gas and flowing said heated gas into said second furnace through said charge therein and thereby heating said charge by heat exchange therewith, and in said second furnace finally reducing and melting said partially-reduced ore from said first furnace in the presence of said solid carbon reducing agent, and thereby producing at least a portion of said reduction gas subsequently fed into said first furnace, and flowing said reduction gas from said second furnace into heat exchange with and thereby preheating said solid carbon reducing agent and reducing said reduction gas temperature before said reducing agent is fed into said second furnace, this preheated reduction gas being said reduction gas flowed into said first furnace from said second furnace.

2. A method according to claim 1 comprising the further step of flowing said gas to which heat energy is supplied through a plasma reactor and transferring heat from said reactor to said gas prior to flowing said gas into said second furnace.

3. A method according to claim 1 wherein said gas to which heat energy is supplied comprises at least in part a reducing gas.

4. A method according to claim 2 comprising the further step of generating a reducing gas in said plasma reactor from said gas flowing therethrough.

5. A method according to claim 1 comprising the further step of feeding additional reducing gas directly into said first furnace for said partial reduction of said ore.

6. A method according to claim 1 comprising the further step of adding to said first furnace and burning therein, supplemental fuel in addition to said reduction gas, for said pre-heating of said ore.

* * * * *

UNITED STATES PATENT AND TRADEMARK OFFICE
CERTIFICATE OF CORRECTION

PATENT NO. : 4,019,895
DATED : April 26, 1977
INVENTOR(S) : Sven Santen

It is certified that error appears in the above-identified patent and that said Letters Patent are hereby corrected as shown below:

Column 1, line 20 change "highh" to --high--.

Column 1, line 33 change " the charge, this" to --the charge; this--.

Column 1, line 62 change " due to for example" to -- due for example, to--.

Column 2, line 41, change " wherein the furnace" to -- wherein furnace--.

Column 2, line 63, change "furnacee" to -- furnace--.

Column 3, line 21, change "lest" to --heat--.

Column 4, line 5, after "extra" insert -- heat--.

Signed and Sealed this

First Day of November 1977

[SEAL]

Attest:

RUTH C. MASON
Attesting Officer

LUTRELLE F. PARKER
Acting Commissioner of Patents and Trademarks